(12) United States Patent
Buchalter et al.

(10) Patent No.: US 6,637,161 B1
(45) Date of Patent: Oct. 28, 2003

(54) FLOOR SYSTEM

(75) Inventors: Mark A. Buchalter, Grand Rapids, MI (US); Richard A. Kroko, Marietta, GA (US); Arthur Y. Tsubaki, Fort Worth, TX (US)

(73) Assignee: Steelcase Development Corporation, Caledonia, MI (US)

( * ) Notice: Subject to any disclaimer, the term of this patent is extended or adjusted under 35 U.S.C. 154(b) by 31 days.

(21) Appl. No.: 09/724,486

(22) Filed: Nov. 28, 2000

(51) Int. Cl.[7] .............................................. E04F 15/024
(52) U.S. Cl. ..................................... 52/126.6; 52/220.5
(58) Field of Search .......................... 52/126.5, 126.6, 52/506.01, 506.06, 508, 126.2, 263

(56) References Cited

U.S. PATENT DOCUMENTS

| | | |
|---|---|---|
| 3,180,460 A | 4/1965 | Liskey, Jr. |
| 3,222,030 A | 12/1965 | Thorpe |
| 3,236,018 A | 2/1966 | Graham et al. |
| 3,279,134 A | 10/1966 | Donovan |
| 3,396,501 A | 8/1968 | Tate |
| 3,420,012 A | 1/1969 | Liskey, Jr. et al. |
| 3,470,663 A | 10/1969 | Tate |
| 3,548,559 A | 12/1970 | Levine |
| 3,583,121 A | 6/1971 | Tate et al. |
| 3,616,584 A | 11/1971 | Sartori et al. |
| 3,681,882 A | 8/1972 | Bettinger |
| 3,696,578 A | 10/1972 | Swensen et al. |
| 3,784,042 A | 1/1974 | Hadfield et al. |
| 3,811,237 A | 5/1974 | Bettinger |
| 3,844,440 A | 10/1974 | Hadfield et al. |
| 3,852,928 A | 12/1974 | Raith |
| 3,924,370 A | 12/1975 | Cauceglia et al. |
| 4,035,967 A | 7/1977 | Harvey |
| 4,067,156 A | 1/1978 | Downing, Jr. |
| 4,074,488 A | 2/1978 | Ray, III |
| 4,085,557 A | 4/1978 | Tharp |
| 4,091,231 A | 5/1978 | Sotolongo |
| 4,113,219 A | 9/1978 | Mieyal |
| 4,277,923 A | 7/1981 | Rebentisch et al. |
| 4,295,319 A | 10/1981 | Griffin |
| 4,319,520 A | 3/1982 | Lanting et al. |
| 4,426,824 A | 1/1984 | Swensen |
| 4,438,610 A | 3/1984 | Fifer |
| 4,447,998 A | 5/1984 | Griffin |
| 4,453,365 A | 6/1984 | Gladden |
| 4,536,612 A | 8/1985 | Domigan |
| 4,546,580 A | 10/1985 | Ueno et al. |
| 4,558,544 A | 12/1985 | Albrecht et al. |
| 4,561,232 A | 12/1985 | Gladden, Jr. et al. |
| 4,573,304 A | 3/1986 | Mieyal |
| 4,574,555 A | 3/1986 | Cline |
| 4,578,910 A | 4/1986 | Germeroth et al. |
| 4,593,499 A * | 6/1986 | Kobayashi et al. ........ 52/126.6 |
| 4,594,833 A | 6/1986 | Mieyal |
| 4,596,095 A | 6/1986 | Chalfant |
| 4,621,468 A | 11/1986 | Likozar |

(List continued on next page.)

Primary Examiner—Michael Safavi
(74) Attorney, Agent, or Firm—Foley & Lardner

(57) ABSTRACT

A floor system for providing a raised floor above a sub-floor in a work environment is disclosed. The floor system includes a plurality of pedestals, a plurality of panels having side cutouts arranged so that the side cutouts are in alignment when the panels are installed on the pedestals to form an access opening from the combination of the side cutouts, an access cover configured to fit over the access opening, and a track configured to rest upon the pedestals and to provide a passage for utility carriers. A floor system is also disclosed for providing a raised floor above a sub-floor to support a load in a work environment. The floor system includes a plurality of pedestals, a frame including a combination of frame members to provide a substantially open frame work supported on the pedestals so that the load is distributed across the frame, and a plurality of panels configured to be installed on the frame and to be quickly and easily removable.

56 Claims, 8 Drawing Sheets

U.S. PATENT DOCUMENTS

| | | | |
|---|---|---|---|
| 4,625,491 A | 12/1986 | Gibson | |
| 4,630,417 A | 12/1986 | Collier | |
| 4,637,181 A | 1/1987 | Cohen | |
| 4,671,832 A | 6/1987 | Cline | |
| 4,685,258 A * | 8/1987 | Av-Zuk | 52/126.6 |
| 4,689,870 A | 9/1987 | Mieyal | |
| 4,719,727 A | 1/1988 | Cooper et al. | |
| 4,721,476 A | 1/1988 | Zeliff et al. | |
| 4,745,715 A | 5/1988 | Hardwicke et al. | |
| 4,780,571 A | 10/1988 | Huang | |
| 4,835,924 A | 6/1989 | Blacklin et al. | |
| 4,850,163 A | 7/1989 | Kobayashi et al. | |
| 4,864,078 A | 9/1989 | Bowman | |
| D306,350 S | 2/1990 | Hardwicke et al. | |
| 4,901,490 A | 2/1990 | Zinniel et al. | |
| 4,905,437 A | 3/1990 | Heather | |
| RE33,220 E * | 5/1990 | Collier | 52/263 |
| 4,922,670 A | 5/1990 | Naka et al. | |
| 4,942,708 A | 7/1990 | Krumholz et al. | |
| 4,996,804 A | 3/1991 | Naka et al. | |
| 4,996,810 A | 3/1991 | Forde | |
| 5,008,491 A | 4/1991 | Bowman | |
| 5,048,242 A | 9/1991 | Cline | |
| 5,053,637 A | 10/1991 | Dillard | |
| 5,057,647 A | 10/1991 | Bogden et al. | |
| 5,072,557 A | 12/1991 | Naka et al. | |
| 5,088,251 A | 2/1992 | Hazeldine | |
| 5,123,435 A | 6/1992 | Blacklin et al. | |
| 5,285,009 A | 2/1994 | Bowman et al. | |
| 5,333,423 A | 8/1994 | Propst | |
| D350,613 S | 9/1994 | Fahy, Jr. | |
| 5,345,779 A | 9/1994 | Feeney | |
| 5,363,613 A | 11/1994 | Sevier | |
| 5,371,985 A | 12/1994 | Suttles | |
| 5,386,670 A | 2/1995 | Takeda et al. | |
| 5,389,737 A | 2/1995 | Kobayashi et al. | |
| 5,440,841 A | 8/1995 | Greenfield | |
| 5,459,968 A | 10/1995 | Jin | |
| 5,467,609 A | 11/1995 | Feeney | |
| 5,468,908 A | 11/1995 | Arthur et al. | |
| 5,477,649 A * | 12/1995 | Bessert | 52/263 |
| 5,483,776 A | 1/1996 | Poppe | |
| 5,499,476 A | 3/1996 | Adams et al. | |
| 5,501,754 A | 3/1996 | Hiraguri | |
| D370,060 S | 5/1996 | Fahy, Jr. | |
| 5,548,932 A | 8/1996 | Mead | |
| RE35,369 E | 11/1996 | Ducroux et al. | |
| 5,571,993 A | 11/1996 | Jones et al. | |
| 5,628,157 A | 5/1997 | Chen | |
| 5,673,522 A | 10/1997 | Schilham | |
| 5,713,168 A | 2/1998 | Schilham | |
| 5,749,188 A | 5/1998 | Belbenoit | |
| 5,791,096 A | 8/1998 | Chen | |
| 5,796,037 A | 8/1998 | Young et al. | |
| 5,828,001 A | 10/1998 | Schilham | |
| 5,842,313 A | 12/1998 | Murray et al. | |
| 5,901,515 A | 5/1999 | Chen | |
| 5,904,009 A | 5/1999 | Huang | |
| 5,904,015 A | 5/1999 | Chen | |
| 5,925,849 A | 7/1999 | Chen | |
| 5,927,030 A | 7/1999 | Petit et al. | |
| 5,943,833 A | 8/1999 | Feldpausch et al. | |
| 5,946,867 A | 9/1999 | Snider, Jr. et al. | |
| 5,953,870 A | 9/1999 | Jette | |
| 5,983,582 A | 11/1999 | Vugrek | |
| 6,101,768 A * | 8/2000 | Springstead et al. | 52/126.6 |
| 6,102,229 A | 8/2000 | Moncourtois | |
| 6,112,483 A | 9/2000 | Murray et al. | |
| 6,114,623 A | 9/2000 | Bonilla et al. | |
| 6,162,071 A | 12/2000 | Müller | |
| 6,202,374 B1 | 3/2001 | Cooper et al. | |
| 6,256,952 B1 | 7/2001 | Fahy, Jr. et al. | |

* cited by examiner

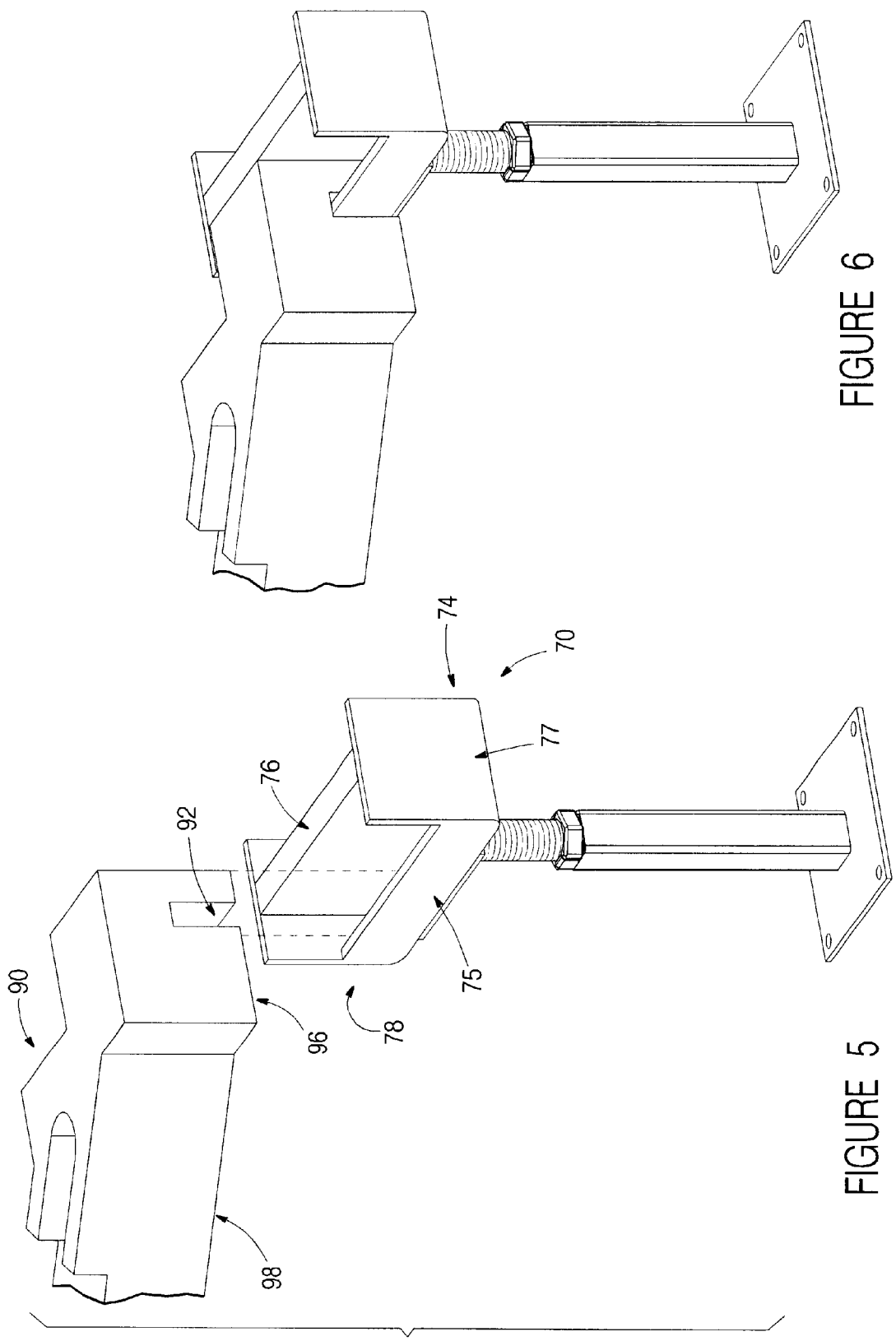

FLOOR SYSTEM

FIELD OF THE INVENTION

The present invention relates to a floor system.

CROSS-REFERENCE TO RELATED APPLICATIONS

None.

BACKGROUND

It is generally known to provide for a raised floor system that includes floor panels installed in a grid upon a supporting structure such as stanchions. Such known floor systems typically provide for floor panels that are composed of a structure or shell (typically steel) and a fill material. The fill material is typically an aggregate or cementitious mixture (e.g. Portland cement and gypsum) and is filled into the frame and allowed to cure to form the floor panel. Because the floor panels must provide a structure suitable to support floor loads, the result is a relatively heavy product (i.e. a complete floor panel of a 24 inch by 24 inch size may weigh approximately 20 to 40 pounds) that must be shipped to the installation site. Shipping costs can become a not insubstantial portion of total product cost (to fix e.g. approximately 20–25 percent for floor panels shipped from the midwest to the west of the United States). Moreover, although the floor panels can be lifted to provide access beneath the raised floor, the floor panels are not typically configured to provide for access points in convenient locations after the raised floor has been installed. Furthermore, the handling of floor panels during shipping, installation and when access is required beneath the raised floor tends to be difficult due to the weight and shape of the floor panels.

Accordingly, it would be advantageous to provide for a floor system that provides a support structure supplemental to stanchions or pedestals or the like and that includes frame members that are separate or independent from the floor panels so that the floor panels themselves can be made of a thinner material (e.g. floor tiles). It would also be advantageous to provide for a floor system that included floor panels with cut-outs and access covers that served a variety of functions such as allowing ready and convenient access to or connection to utilities such as power, voice and data.

SUMMARY

The present invention relates to a floor system configured for providing a raised floor above a sub-floor in a work environment. The floor system includes a plurality of pedestals, a plurality of panels having side cutouts arranged so that the side cutouts are in alignment when the panels are installed on the pedestals to form an access opening from the combination of the side cutouts, an access cover configured to fit over the access opening, and a track configured to rest upon the pedestals and to provide a passage for utility carrier.

The present invention also relates to a floor system configured for providing a raised floor above a sub-floor to support a load in a work environment including a plurality of pedestals, a frame including a combination of frame members to provide a substantially open frame work supported on the pedestals so that the load is distributed load across the frame, a plurality of panels configured to be installed on the frame and to be quickly and easily removable.

DESCRIPTION OF THE FIGURES

FIG. 5 is an exploded perspective view of a floor system frame and support according to a preferred embodiment.

FIG. 6 is a perspective view of a floor system and support according to a preferred embodiment.

DETAILED DESCRIPTION OF PREFERRED AND OTHER EXEMPLARY EMBODIMENTS

Figure 1:
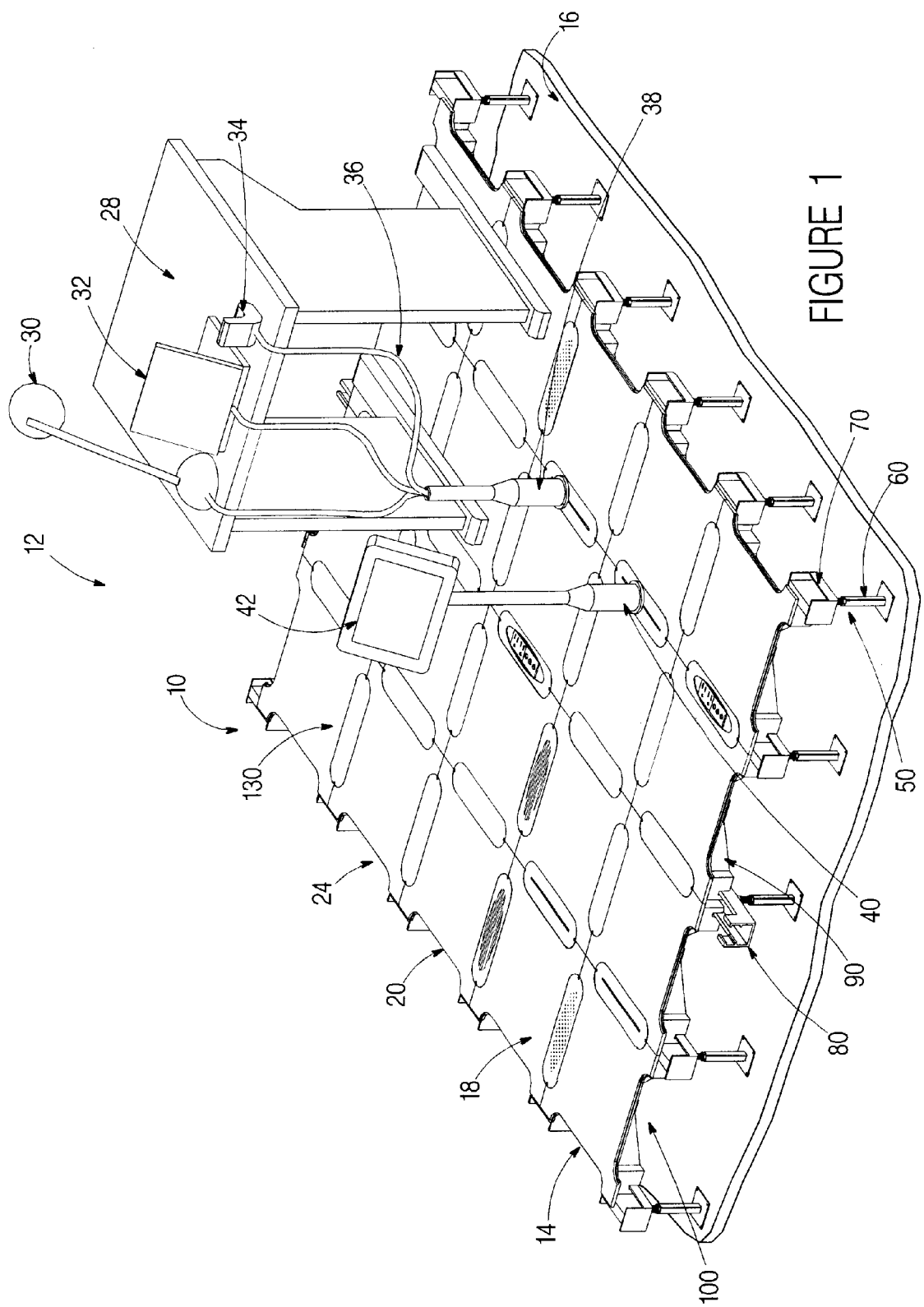
FIG. 1 is a perspective view of a floor system according to a preferred embodiment.

Referring to FIG. 1, a floor system 10 is shown in a work environment 12 according to a preferred embodiment of the present invention. Floor system 10 is configured for use in a work environment 12 or the like according to any preferred embodiment, but may be used in a wide variety of other spaces according to alternative embodiments. System 10 has the flexibility to be used for an entire floor surface, or for one or more selected portions of floor surfaces where additional infrastructure (e.g. computing, data processing, communications, etc.) is desired by providing a raised floor 14 installed above a sub-floor 16 (e.g. poured concrete floor).

Raised floor 14 is formed of a plurality of thin tiles or panels 18 which are typically arranged in a grid-like pattern to form a floor surface 20 (shown in a horizontal plane) having one or more levels. A plurality of interchangeable inserts or access covers 130 may provide flexibility in developing user-changeable floor access pattern 24 for providing access to utilities or mounting structure for articles of furniture or other items. One or more articles of furniture (such as a desk 28) or appliances (e.g. a lamp 30) such as computing devices (e.g. a notebook computer 32) and other telecommunication or data interchange devices (e.g. in the form of a docking station or port 34 for a telephone or personal digital assistant) can be used through raised floor 14 in work environment. The appliances are interconnected to power, voice and/or data as required through cables 36 (e.g. utility carriers) leading from a utility post 38 having access to utilities and slidable positional adjustment through access cover 140. Other articles of furniture such as stand 40 for a display panel 42 may also be positioned on raised floor and interface for access to utilities and slidable positional adjustment through access cover 140. Access pattern 24 provides flexibility in locating utility post 38 and stand 40 to suit work environment 12, and access cover 140 provides an additional degree of flexibility by permitting positional adjustment of utility post 38 and stand 40 to be freely slidable along a track 146 in access cover 140 on raised floor 14.

Raised floor 14 may be supported above sub-floor 16 by a support structure using pedestals or supports 50. The pedestals or supports may utilize existing supports in applications where an existing floor system is being modified, converted or replaced. Alternatively, supports 50 may be provided for an entire floor system or for supplementing existing support systems. In a particularly preferred embodiment, supports 50 may be stanchions 60 that are coupled to a bracket or fixture 70 or to a track 80 (e.g. channel or track or rail) that support one or more frame members 90 that are assembled into a framework 100 for providing a rigid, open support structure upon which the plurality of panels 18 and access covers 22 may be placed. Frame members 90 provide a floor load bearing structure which permits the use of relatively thin floor panels (e.g. cover panels). According to any alternative embodiment, a floor covering 15 of any commercially available type (e.g. carpet, tile, sheet goods, etc.) may overlay the panels and access covers as may be required in the particular space or facility in the office or work environment.

Figure 2:
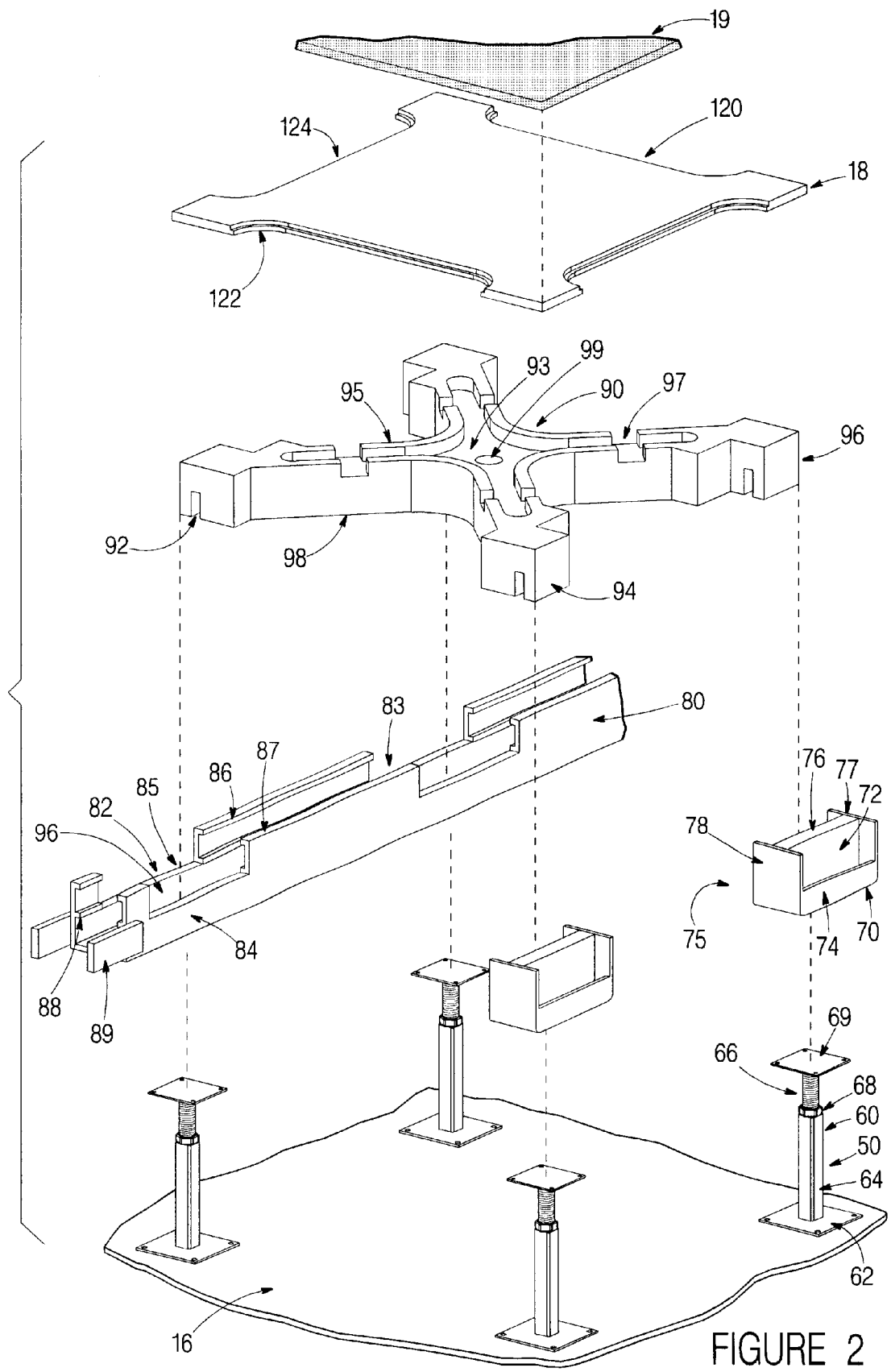
FIG. 2 is an exploded perspective view of a floor system frame and supports according to a preferred embodiment.

Referring to FIG. 2, a segment of floor system 10 is shown according to a preferred embodiment. Sub-floor 16 provides a foundation upon which stanchions 60 may be positioned to support raised floor 14. According to an alternative embodiment, stanchions 60 may be fastened to a mat (not shown) which may be rolled-out on a sub-floor 16, whereby stanchions 60 and pre-positioned to support framework 100 to allow installation to be completed more rapidly. Stanchion 60 has a base 62 resting on sub-floor 16 for distributing the load from raised floor 14 and to improve stability of floor system 10. Stanchion 60 includes a column. 64 (shown as a square tube, but may have any suitable cross sectional shape) attached to base 62 at a lower end of column 64. An upper end of column 64 may receive a height adjustment mechanism (shown as a threaded member 66 in FIG. 2, but may also be a pinned member) for adjusting (e.g. "telescoping") the overall height of the stanchion. Threaded member 66 may receive a locking mechanism (shown as a threaded nut 68 in FIG. 2) that secures the height-adjusted position of threaded member 66 relative to column 64. Threaded nut 68 may have an anti-rotation feature such as a tab or shoulder (not shown) that engages column 64 to prevent rotation of nut 68 after threaded member 66 has been height-adjusted and received in column 64.

A platform 69 may be attached at an upper end of threaded member 66 to provide a bearing surface adapted for either fixture 70 or track 80. According to a particularly preferred embodiment, platform 69 may be attached to an upper end of threaded member 66 by threaded engagement. Platform 69 may be attached to fixture 70 or track 80 by conventional fasteners or connectors (e.g. bolts or screws or interfitting brackets or mating male and female elements or other retaining elements). In other alternative embodiments, the platform may not be needed (e.g. the track or fixture are directly connected to the column) or the platform be attached to an upper end of threaded member by any of a variety of commercially suitable arrangements (including, but not limited to, integral formation, welding, ball-and-socket, etc.). According to another alternative embodiment, platform 69 may be eliminated and an upper end of threaded member 66 may be attached to an underside of either fixture 70 or track 80 (e.g. by any commercially suitable arrangement such as a mating threaded collar or receptacle (not shown)). The components of stanchion 60 are preferably made of any suitable and commercially available material (e.g. including, but not limited to, steel, aluminum, or plastic). The height-adjustable stanchion 60 allows compensation for irregularities in the surface height of sub-floor 16 to maintain a uniformly horizontal and planar raised floor 14. In other alternative embodiments the column may have any suitable cross section such as a cylinder, with or without interior or exterior threads, for internally or externally receiving a height adjustment mechanism.

Referring further to FIG. 2, track 80 is shown according to a preferred embodiment. Track 80 may provide a structure having a continuous channel or passageway for routing one or more utility carriers (e.g. cables) (shown in FIG. 8) beneath panels 18 and for supporting one or more frame members 90. Track 80 may provide an alternative passageway for routing data or communication carriers (see FIG. 8) that may require separation or shielding from power cables. The cross-sectional shape of track 80 may be generally square or rectangular having a longitudinal opening and may be provided in variable lengths that can be either standardized for ease of ordering and shipping, or customized to suit particular installations. In a particularly preferred embodiment, track 80 may be composed of a rigid structural material (e.g. including, but not limited to, steel, aluminum, plastic, or a composite combination thereof). Alternatively, the track may be composed of any material having suitable structural characteristics for supporting the raised floor. In other alternative embodiments, the track may be made at least partially of or may provide an interface of a conducting material (e.g. aluminum, copper, etc.) and serve as a utility carrier in addition to providing support to raised floor 14 and providing a passageway for other utility carriers (i.e. a support structure that is also a utility carrier and capable of routing other utility carriers). The track may also be configured to provide a utility interface for a wide variety of appliances directly or through a suitably configured access cover by a quick-connect engagement (e.g. "insert and rotate" on "bus stab" or like connections). One or more mounting interfaces (shown as including cut-outs 82) are provided on (one or both) sides of track 80; each cut-out 82 on track 80 may be sized for engagement of a corresponding mounting interface of the frame member. Mounting interface (shown as cut-outs 82) includes partial walls 84, 85 on one or both vertical sides of track 80 configured to engage opening 92 on frame 90 in a slot-and-plate engagement so that face 94 projects into a cavity 96 within the interior of track 80. The width of track 80 is sized so that a gap (shown in FIG. 8) is maintained between faces 94 (i.e. ends) of adjacent frame members 90 mounted in cut-out 82 on opposing sides of track 80 to provide a space for running utility carriers 162 (shown in FIG. 8) within track 80 and beneath panels 18. Top horizontal flanges 86, 87 are formed on track 80 for providing a panel support surface and an opening 87 may be created between flanges 86 corresponding to gap 164 between opposing faces 94 of frame members 90 to provide a passageway 160 (shown in FIG. 8) for running utility carriers within track 80 and beneath panels 18. Intermediate horizontal flanges 88 may be included on the interior surface of track 80 for improving the rigidity and bending resistance of track 80 and for partially partitioning passageway 160 and for providing a structure for having or including conductive properties for transmitting utilities.

Referring further to FIG. 2, a mounting interface (shown as including fixture 70) is shown according to a preferred embodiment of the present invention for providing an alternative interface for supporting one or more frame members 90. In a preferred embodiment, fixture 70 may have a symmetrical blockshape with suitable recesses 72 adapted to receive an end portion 96 on each of two adjacent frame members 90 on a first side and adapted to receive end portion 96 on each of two adjacent frame members 90 on a second side. Fixture 70 is configured with recesses 72 sized to receive end portions 96 of symmetric frames 90 in ninety (90) degree rotational increments and end portions 96 of semi-symmetrical frames 90 in one-hundred and eighty (180) degree rotational increments without having to be turned or rotated. In an alternative embodiment, fixture 70 may be sized to receive one or more end portions 96 of frame 90. Fixture 70 has side walls 74, 75 configured to engage opening 92 on frame 90 in a slot-and-plate engagement, and recesses 72 configured to receive end portion 96 of frame 90. Recesses 72 are sized to restrict lateral movement of frame members 90. A spacer 76, centrally located between sides 74 and 75 having a thickness corresponding to the width of gap 164 between faces 94 of opposed end portions 96 installed on track 80 is provided in fixture 70 to maintain overall dimensional uniformity of framework 100 when floor system 10 includes a combination of fixtures 70 and tracks 80. Fixture 70 includes opposing end walls 77, 78 that are spaced to laterally capture adjacent end portions 96 of frame members 90. According to a particularly preferred embodiment, fixture 70 may be made from a durable and recyclable material including, but not limited to, steel, aluminum, plastic or a composite combination thereof. According to alternative embodiments, fixture 70 may have any suitable size and shape for receiving end portions 96 of one or more arms 98 on frame 90. According to other alternative embodiments, fixture 70 may be adapted for coupling to existing floor system supports (not shown) for readily adapting floor system 10 to replace an existing raised floor system (not shown). According to other alternative embodiments, the stanchion may be adapted to support segments of panels and frame members created when a floor system geometry does not conform to a number of uniform panels. The height adjustment feature of stanchion 60 may be varied to allow side walls 74, 75 to provide a vertical support for segmented sections of frame 90.

Referring further to FIG. 2, frame 90 is shown according to a preferred embodiment. Frame member 90 may be a generally open shape shown as cross-shaped member having arms 98 for spanning an area (across stanchions or tracks) that supports panel 18. Arms 98 include a cross sectional profile having raised sides 95 joined by an interior web 93 intended to provide a rigid structure that reduces cost and overall weight (and deflection when subject to loading). In alternative embodiments, frame members 90 may have any shape or cross sectional profile suitable for spanning an area that supports panel 18. According to a particularly preferred embodiment, frame members 90 may span a square area having dimensions approximately 24 inches by 24 inches, allowing a variation of approximately plus and minus one inch for accommodating overhang 21 (shown in FIG. 7) on panel 18 and may be composed of a fiberglass-reinforced sheet molding compound commercially available from GMI Composites of Muskegon, Michigan. According to other alternative embodiments, frame members 90 may be made of any rigid structural material having low flammability including, but not limited to, steel, aluminum, plastic or a composite combination thereof. Arms 98 may include one or more mounting interfaces shown as including openings or notches 97 adapted for receiving hardware such as utility junctions 110 (shown in FIG. 3), and an aperture 99. In a preferred embodiment, arms 96 include an end portion 96 having an opening 92 (e.g. a slot as shown in FIG. 2) for engaging side walls 74, 75 on fixture 70 or for engaging partial wall 84 on track 80 for "fastenerless" installation. According to a particularly preferred embodiment, frame members 90 may be partially symmetrical for installation in 180 degree rotational increments, or frame members 90 may be completely symmetrical for installation in 90 degree rotational increments. End portion 96 may have a symmetrical or semi-symmetrical corner-shape (allowing installation in 90 degree or 180 degree rotational increments) and abut an adjacent frame 90 and end walls 77, 78 and spacer 76 when fitted within recess 72 on fixture 70. Fixture 70 is configured with recesses 72 sized to receive end portions 96 of symmetric frames 90 in 90 degree rotational increments and end portions 96 of semi-symmetrical frames 90 in 180 rotational increments without having to be turned or rotated. When end portions 96 are fitted within cut-out 82 on track 80, end portions 96 abut an adjacent frame and the sides of cut-outs 82. According to any preferred embodiment, the mounting interfaces provided at stanchions (e.g. fixtures or rails) provide a secure "fastenerless" engagement with the mounting interfaces provided at frame members. According to an alternative embodiment, frame 90 may be trimmed, cut or segmented to fit the geometry of a particular floor system application and may be supported by adapting stanchion to hold one or more portions of the remaining frame 90 segment.

Referring further to FIG. 2, panel 18 is shown according to a preferred embodiment. Panel 18 has a generally square shape with a side cut-out 120 along one or more sides. According to a particularly preferred embodiment, panels 18 are a square having dimensions approximately 24 inches by 24 inches and side cut-outs 120 have an oblong (elliptical) shape (as shown). According to alternative embodiments, the panels may be cut or trimmed to suit any particular floor system geometry and have any suitable shape and size, and side cut-outs may also have any other suitable shape (e.g. square, rectangular, triangular, circular, etc.) for creating an access opening and suitable interfaces for access covers 130. Side cut-outs 120 may have a retention profile (shown as a ledge 122 in FIG. 2) for receiving and supporting access covers 130. In a particularly preferred embodiment, the shape and position of side cut-outs 120 are uniform so that installation of multiple panels 18 having side cut-outs 120 will create a uniform access opening 124 between adjacent panels allowing for interchangeability of access covers 130 (e.g. of a variety of types and functions such as providing access to utilities routed beneath raised floor 13 or attachment of articles). By selective arrangement of access covers 130 within a floor an access pattern adapted to conform to the utility needs of work environment 12 may be created (e.g. during original installation or during reconfiguration of the floor). According to a particularly preferred embodiment, panel 18 may be recyclable and made of any commercially suitable flooring material having the desired strength, durability, sound absorption, and low flammability characteristics. Panel 18 may be provided in a variety of colors to compliment an interior design scheme, and may have a variety of surface textures that are suited to the intended usage and application. Floor covering 19 may overlay panels 18 and access covers 130 and may be composed of any commercially available floor covering (e.g. carpet, tiles, vinyl, sheetgoods, etc.) suited to the application of floor system 10.

Figure 3:
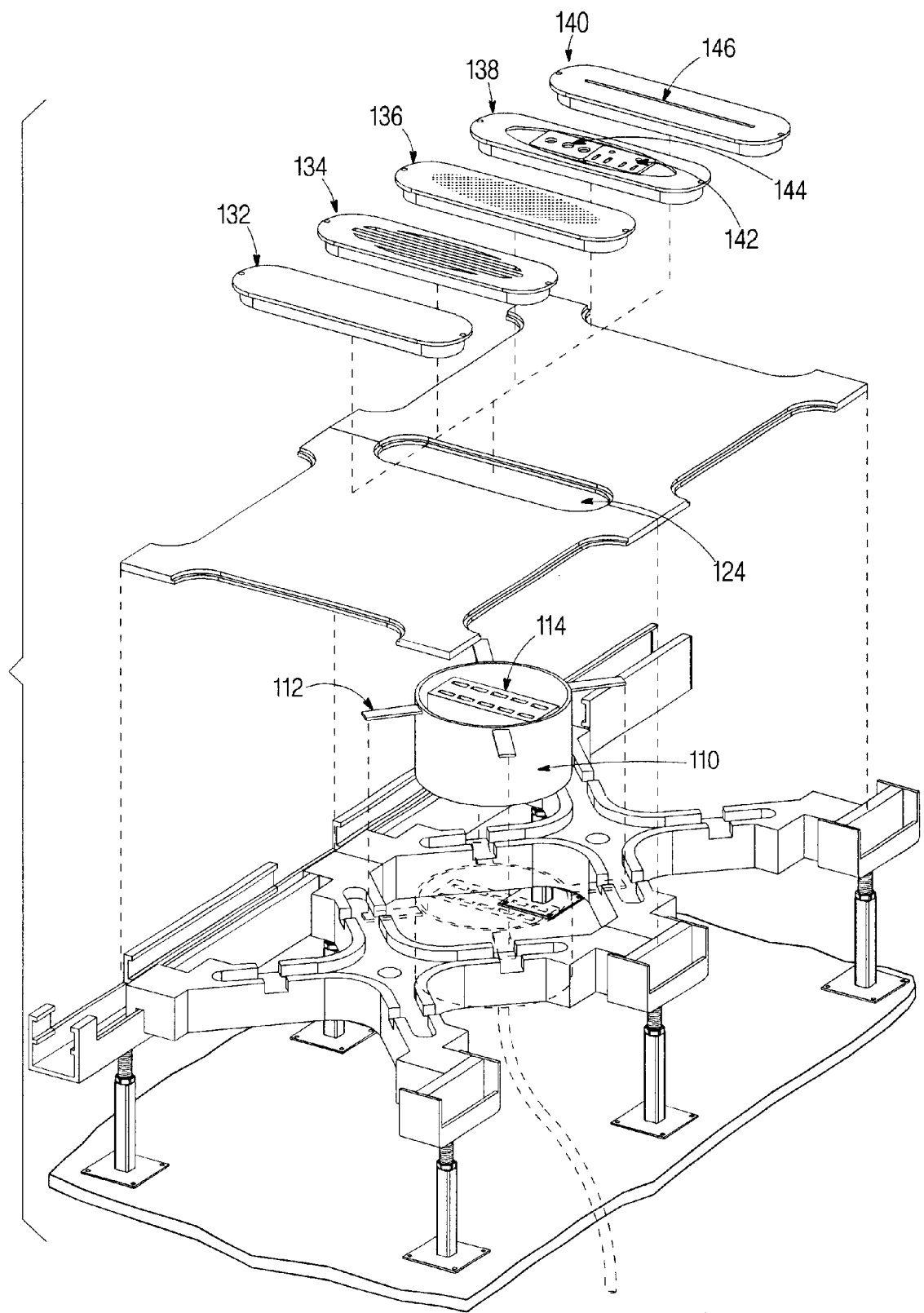
FIG. 3 is an exploded perspective view of a floor system frame and panels according to a preferred embodiment.

As shown by examples in FIG. 3, a variety of access covers may be used in the floor system according to any preferred embodiment. Access covers 130 may have a variety of forms or functions each with shapes that are interchangeable (e.g. to provide an access pattern for accessing utilities (for example a utility carrier 162 as shown in FIG. 3) that may be routed within the space between sub-floor 16 and panels 18). Access covers 130 may provide utility interface to facilitate efficient access to utilities in work environment. A solid access cover 132 may have a solid surface and may be adapted for use in access aperture 124 locations where a continuous floor surface is desired and no utility access is required. Slotted grill access cover 134 may have a series of slots that may be adapted for use in access aperture 124 locations where audio or ventilation transmission is desired. Perforated grill access cover 136 may have a pattern of apertures that may be adapted for use in access aperture 124 locations where audio or ventilation transmission is desired. Receptacle access cover 138 may include one or more receptacles (shown as a plurality of outlets 142 and jacks 144 in FIG. 3) for connection to utilities such as power voice and/or data systems (e.g. through any of a variety of plugs, connectors, transmitters, receivers, etc.) where access to utilities is desired. Access cover 140 may include one or more channels 146 (shown as a slot in FIG. 3) for attachment to an article of furniture or the like (as shown in FIG. 1) and also for providing an interconnection to utilities (e.g. a utility post 40).

Further referring to FIG. 3, a utility junction 110 is shown. Utility junction 110 provides a structure for receiving, routing, distributing, or connecting utility carriers 162. Utility carriers 162 may include wires, cables, optical fibers or other devices for carrying utilities (e.g. power, voice and/or data). Utility junction 110 may have any size and shape (shown as cylindrical in FIG. 3) that is adapted to fit between adjacent frame members 90 and within the vertical space between subfloor 16 and panels 18. A mounting interface (shown as including supports 112) may be attached to utility junction 110 and adapted to engage notches 97 in frame members 90 for a secure engagement at an elevation beneath panel 18 and access openings 124 (e.g. for routing utilities from the space beneath raised floor 14 to access covers 130). Utility junction 110 may also contain utility interfaces such as plugs, sockets, connectors, splices, terminal boards, etc. (shown schematically as connector 114 in FIG. 3) for connecting and directing utilities. Utility junction 110 may also have one or more apertures (not shown) for receiving and interfacing utility carriers 162. According to an alternative embodiment, utility junction 110 may have an open bottom (not shown) for receiving ventilation through a plenum formed by the space between sub-floor 16 and raised floor 14 or through ductwork (not shown) for providing a heating, ventilation or air-conditioning (HVAC) supply to access covers 130 and may include a fan (not shown) for improving HVAC circulation. According to another alternative embodiment, utility junction 110 may contain infrastructure components (e.g. wiring harnesses with quick-connects, data and voice communication controls, thermostats, timers, circuit breakers, etc. - not shown) that are accessible to a user via access cover 130.

Figure 4:
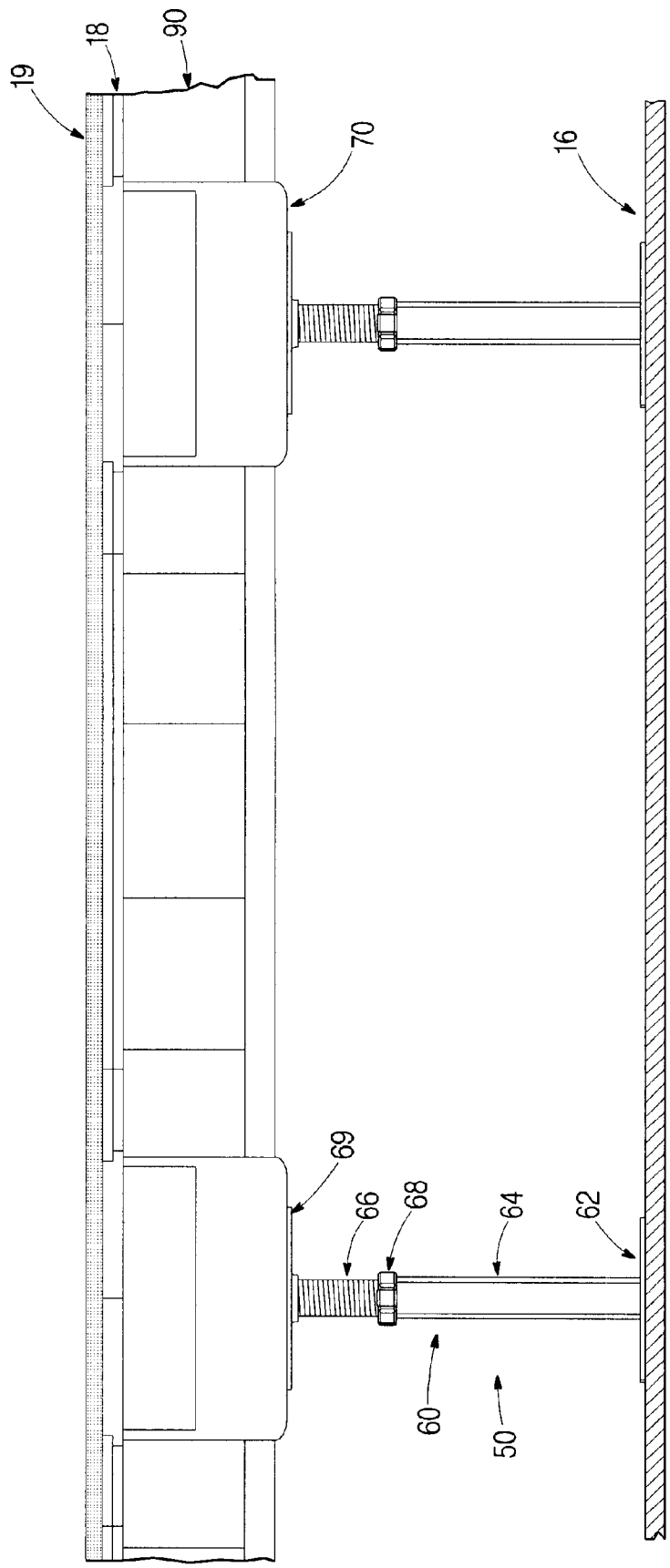
FIG. 4 is a side elevation view of a floor system according to a preferred embodiment.

Referring to FIG. 4, a side view of floor system 10 is shown according to a preferred embodiment. Fixtures 70 and frame members 90 combine to form framework 100 having a generally uniform and horizontal top planar surface for supporting panels 18 and floor covering 15.

Referring to FIGS. 5 and 6, an assembly of fixture 70 and arm 98 of frame 90 are shown in a preferred embodiment. Fixture 70 is symmetrically configured to receive an end portion 96 of arm 98 by slot-and-plate engagement of opening 92 and side wall 74, 75, so that each side of fixture 70 captures and laterally retains the abutting end portions 96 of two adjacent frame members 90. Spacer 76 positions arms 98 to maintain dimensional uniformity of frame members 90 and overlaying panels 18 when tracks 80 are used in conjunction with fixtures 70 in floor system 10. Side walls 74, 76 on fixture 70 and opening 92 on end portion 96 of arm 98 are correspondingly dimensioned so that the top surface of the fixture and the top surface of frame 90 provide a generally uniform, level and horizontal surface. End portions 94 are shown semi-symmetric for installation in 180 degree rotational increments, but may also be symmetric for installation in fixture 70 or track 80 in ninety (90) degree rotational increments.

Figure 7:
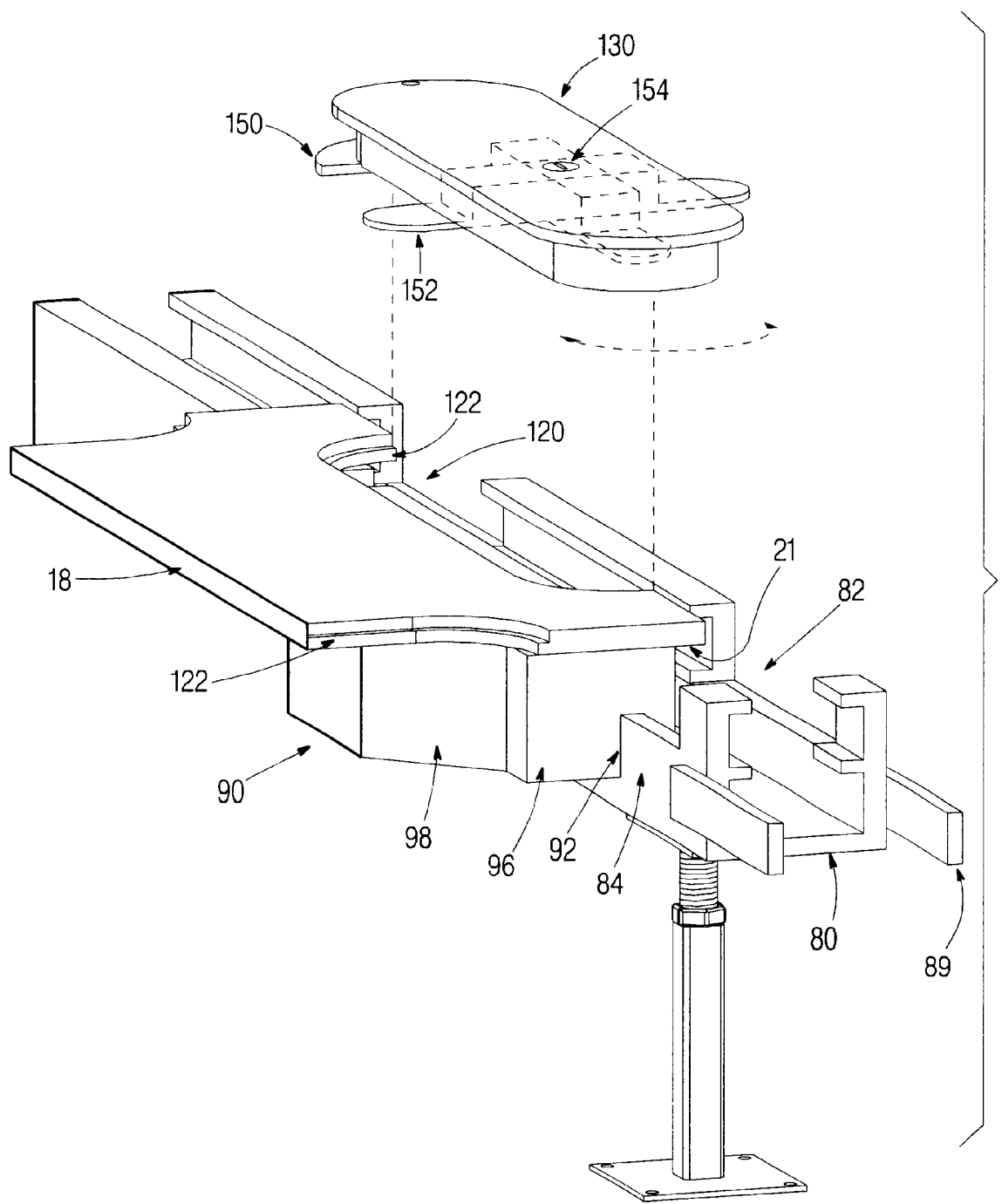
FIG. 7 is an exploded perspective view of a floor system and access cover according to a preferred embodiment.

Referring to FIG. 7, an assembly of track 80, frame 90, and panel 18 is shown according to a preferred embodiment. Splice tabs 89 may be provided on opposing sides at one or both ends of track 80 to facilitate joining an abutting end of another track (not shown) and for maintaining conductivity of abutting tracks 80 having conducting capability. Splice tabs 89 may have a "fastenerless" engagement with an abutting track by laterally capturing the abutting track within tabs 89. Alternatively fastener splice tabs 89 may be configured for a fastener (e.g. set screw, etc. (not shown)) for joining splice tabs 89 to abutting tracks 80. Cut-out 82 on track 80 is configured to receive end portion 96 of arm 98, by slot-and-plate engagement of opening 92 and partial wall 84, so that each side of track 80 captures and laterally retains the abutting end portions 96 of two adjacent frame members 90. Partial walls 84, 85 formed by cut-out 82 on track 80 are dimensioned so that the top surfaces of top flanges 86, 87 on track 80 and the top surface of frame 90 provide a generally uniform and level top surface. The width of track 80 may be sized so that gap 164 (shown in FIG. 8) is maintained between faces 94 of opposing end pieces 96 when a plurality of frame members 90 are mounted in cut-out 82 to provide a space for running utility carriers 162 within track 80 and beneath panels 18. Gap 164 (shown in FIG. 8) between opposing faces 94 of end portions 96 may have the same width as opening 83 between top flanges 86, 87 on track 80 to provide a uniform passageway (shown in FIG. 8) for routing utility carriers beneath panels 18. Panels 18 are each sized to provide an overhang 21 that extends beyond face 94 to the center of track 80 and covers one half of gap 164, so that an adjacent panel installed on the opposite side of track 80 provides a tight seam (shown in FIG. 1) that covers gap 164. Similarly, overhang 21 on adjacent panels 18 covers spacer 76 on fixture 70 when panels 18 are installed on opposite sides of spacer 76 (shown in FIG. 1).

Referring further to FIG. 7, a retention interface for access cover 130 is shown according to an preferred embodiment. Depending on the application (e.g. the magnitude and direction of structural loading on floor system) access covers 130 may include a mechanism for being removably retained within access aperture 124. A lower lip 150 may be attached to a first end of access cover 130 for positioning beneath ledge 122 on side cut-out 120 to prevent the first end of access cover 130 from lifting above panel 18. One or more keepers 152 may be rotatably attached to the underside of an opposite second end of access cover 130 and may be rotated inward to allow installation of access cover 130 into access aperture 124. A control element 154 (shown as a flush-mounted rotating member having a recessed slot) coupled to keepers 152 may be turned to rotate keepers 152 outward to a position beneath ledge 122 of side cut-out 120 to lock access cover 130 into panels 18. According to an alternative embodiment, keeper 152 and control element 154 may be slidably actuated.

Figure 8:
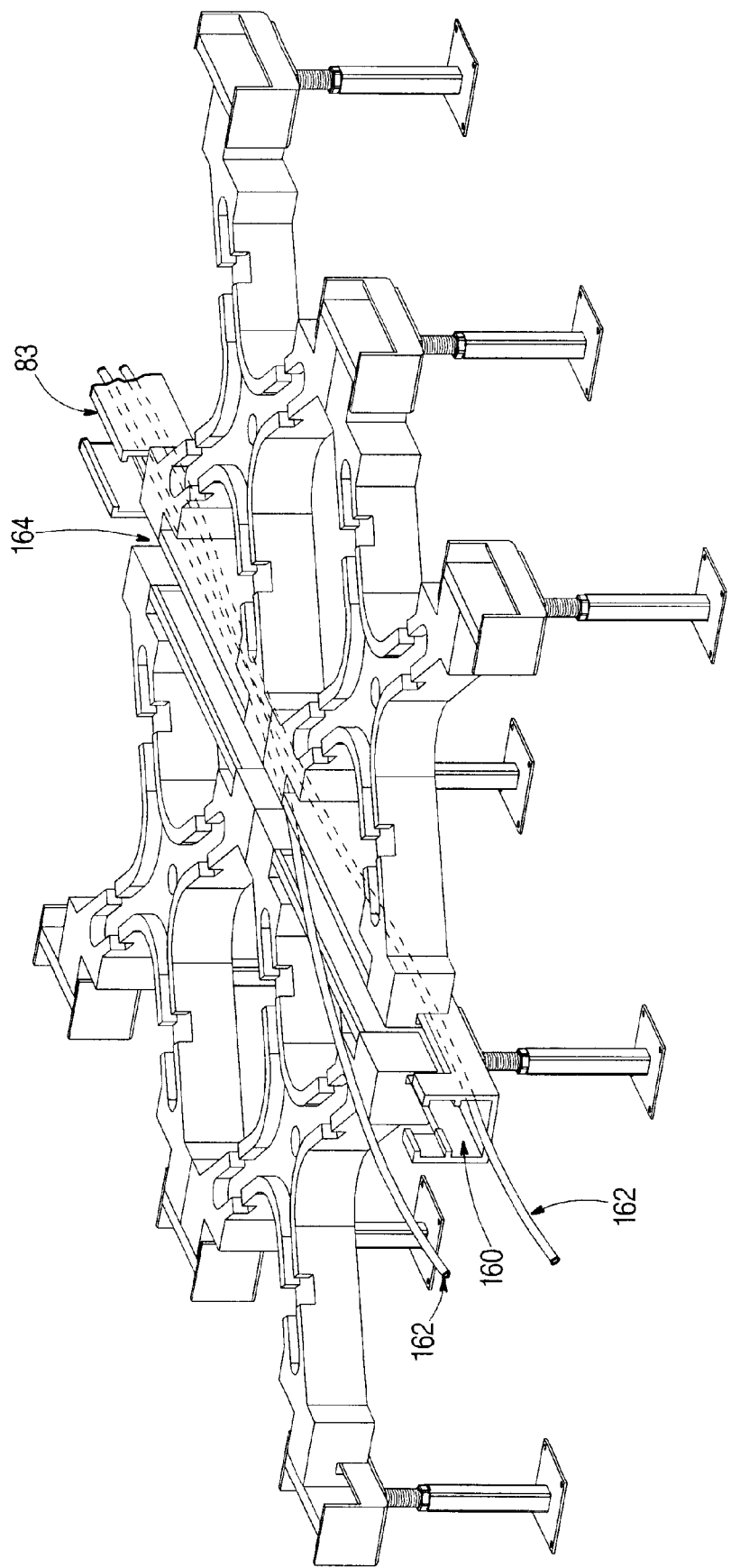
FIG. 8 is a perspective view of a floor system frame and utility passageway according to a preferred embodiment.

Referring to FIG. 8, a continuous channel or passageway 160 for routing utility carriers 162 beneath floor panels 18 is shown according to a preferred embodiment. Utility carriers 162 may be placed within gap 164 between opposing end portions 96 of frame members 90 when mounted on track 80. In a particularly preferred embodiment, passageway 160 may be used to route low voltage communication and data carriers separately from electrical power carriers to minimize signal distortion or interference. Track 80 may be also serve as a utility carrier by including one ore more longitudinal conducting elements (e.g. aluminum, copper, etc. (not shown)) in addition to providing support to raised floor 14 and providing a passageway for other utility carriers (i.e. a support structure that is also a utility carrier and capable of routing other utility carriers). Track 80 having conducting elements (not shown) that perform a utility carrier function may also be configured to provide a utility interface for a variety of office appliances by having suitable adaptations for receiving and holding an appliance in operative engagement with the conductive elements. An insulator (not shown) may be provided to electrically isolate the conducting elements from the track 80 structure. Overhang 21 on adjacent panels 18 positioned on opposite sides of track 80 provides a tight seam that covers gap 164 and conceals utility carriers 162 beneath panels 18.

Figure 9B:
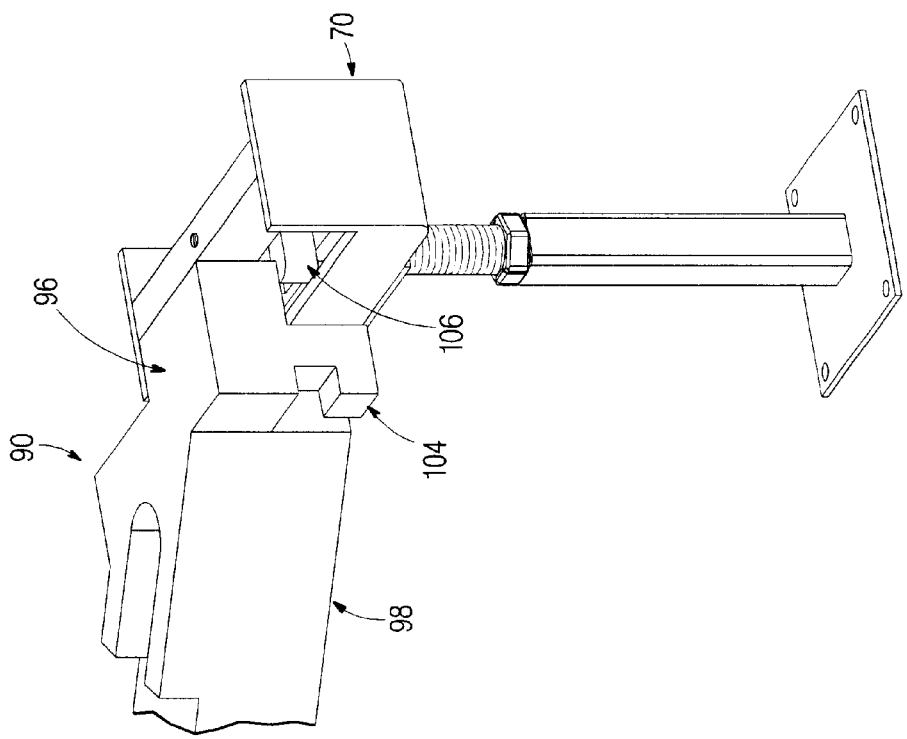
FIG. 9B is a perspective view of a locking frame and support according to a preferred embodiment.
Figure 9A:
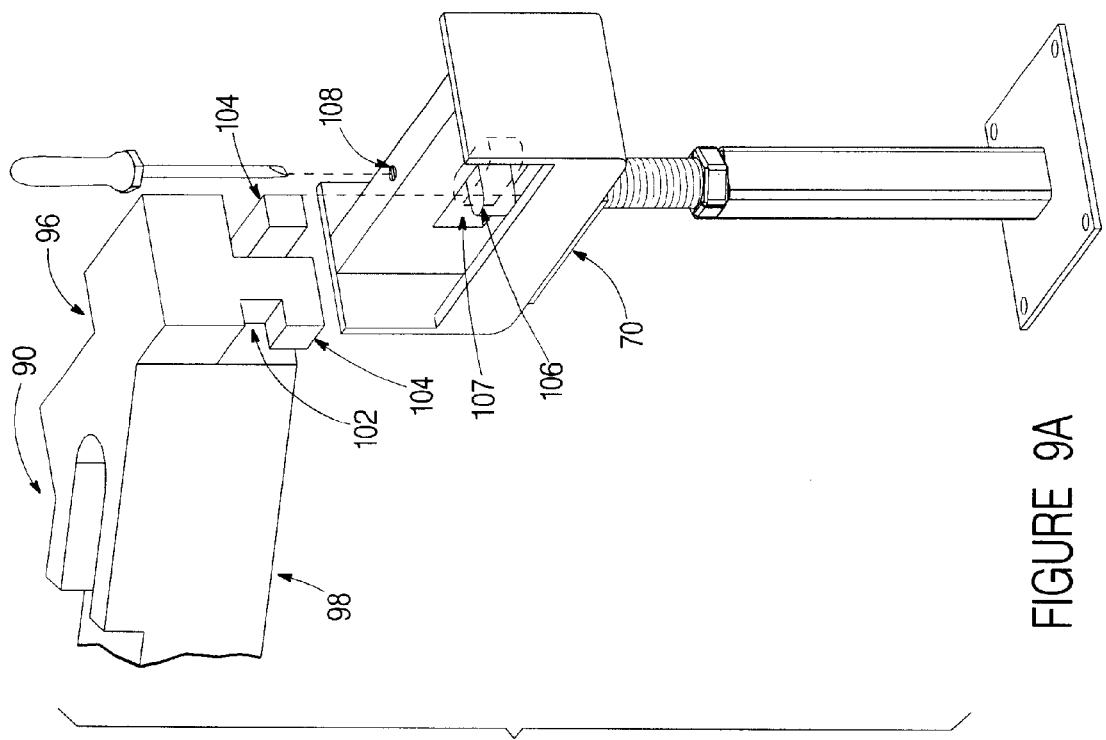
FIG. 9A is an exploded perspective view of a locking frame and support according to a preferred embodiment.

Referring to FIGS. 9A and 9B, an assembly of a locking fixture 70 and end portion 96 of frame 90 is shown according to a preferred embodiment. Fixture 70 may receive frame 90 in one-hundred and eighty (180) degree or ninety (90) degree rotational increments. End portion 96 may have openings 102 and legs 104 configured to receive a rotatable block or tang 106 for releasably locking frame 90 into fixture 70. Spacer 76 may have an opening or window 107 sized and located to contain rotatable tang 106 in a retracted position for installation and removal of frame 90 from fixture 70. Rotatable tang 106 may be configured to rotate in a horizontal plane and legs may extend at a slight angle from horizontal (not shown) whereby rotatably engaging tang 106 into leg 104 improves retention by creating-an interference type compression between fixture 70 and frame 90. A control element 108 may. extend vertically through an aperture in spacer 76, and attach to rotating tang 106, whereby rotating control element 108 ninety (90) degrees will rotate tang 106 into locking engagement with leg 104. A top portion of control element 108 may have any suitable aperture for receiving a rotation, tool (e.g., screwdriver, etc.).

It is important to note that the construction and arrangement of the elements of the floor system as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the floor system may be adapted for a wide variety of applications including offices, data processing rooms, commercial, residential, retail and public facilities, etc. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A floor system comprising:
   a plurality of panels, a pair of adjacent panels having one or more side cut-outs, wherein the side cut-out of adjacent panels defines one or more access apertures;
   a plurality of removably interchangeable access covers for covering the access apertures and providing an interface for accessing utilities;
   one or more utility junctions for delivering utilities to the access apertures;
   a plurality of frame members combining to form a framework for supporting the panels, the access covers and the utility junctions; and
   a plurality of supports for supporting the frame members in one or more generally horizontal planes above a sub-floor;
   wherein at least one frame member attaches to at least three supports not co-linear and provides a central support so that a load can be distributed across the framework; and
   wherein the plurality of access covers comprise an access cover for movably attaching a utility-receiving appliance and one or more of the plurality of access covers have a lip projecting outward from an underside surface of the access cover so that the lip engages an underside of one or more adjacent panels to maintain the access cover within the access aperture.

2. The floor system of claim 1 wherein the plurality of access covers include a solid access cover.

3. The floor system of claim 1 wherein the plurality of access covers include a grill access cover having a plurality of slots.

4. The floor system of claim 1 wherein the plurality of access covers include a grill access cover having a plurality of apertures.

5. The floor system of claim 1 wherein the plurality of access covers include a receptacle access cover having one or more receptacles for interfacing with utilities.

6. The floor system of claim 1 wherein one or more of the plurality of access covers have one or more keepers rotatably attached to the underside surface of the access cover for selectively locking the access cover into the access aperture when the keepers are rotated to engage the underside of one or more adjacent panels.

7. The floor system of claim 1 wherein the utilities are one or more of electric power, heating, ventilation or air conditioning, or voice or data communications.

8. The floor system of claim 7 wherein the utility junctions contain one or more interfaces for connecting and routing utilities.

9. The floor system of claim 1 wherein the utility junctions are cylindrical.

10. The floor system of claim 9 wherein the utility junctions are located beneath the access apertures, and are laterally positioned between adjacent frame members.

11. The floor system of claim 10 wherein the utility junctions are attached to the frame members.

12. The floor system of claim 1 wherein the supports are attached to a flexible mat, whereby the flexible mat can be overlayed on the sub-floor to provide a pre-established support network.

13. The floor system of claim 1 wherein the frame members have a plurality of cojoined arms horizontally spanning a panel support area.

14. The floor system of claim 13 wherein the cojoined arms are cross-shaped and are at least partially symmetric.

15. The floor system of claim 14 wherein the frame members have one or more openings in the arms located to removably engage the supports.

16. The floor system of claim 15 wherein the frame members and supports are configured for locking engagement.

17. The floor system of claim 16 wherein one or more of the supports include a rotatable member configured to engage the one or more openings in the arms for compressing the frame members into the one or more supports.

18. The floor system of claim 1 wherein the plurality of supports include a height-adjustable stanchion.

19. The floor system of claim 18 wherein the height adjustable stanchion supports a fixture for releasably receiving one or more frame members.

20. The floor system of claim 18 wherein the height-adjustable stanchion supports a track having one or more cut-outs for releasably receiving one or more frame members.

21. The floor system of claim 20 wherein the track has an interior cavity providing a passageway for routing or distributing utility carriers.

22. The floor system of claim 21 wherein a gap exists along a longitudinal axis of the track between the arms of adjacent frame members engaged on opposing sides of the track, whereby utility carriers can be installed through, or within, the gap after the frame members have been removably installed on the track.

23. A floor system comprising:
    a plurality of panels, a pair of adjacent panels having one or more side cut-outs, wherein the side cut-out of adjacent panels defines one or more access apertures;
    a plurality of access covers for covering the access apertures and providing an interface for accessing utilities;
    one or more utility junctions for delivering utilities to the access apertures;
    a plurality of frame members comprising a plurality of cojoined arms that are cross-shaped and at least partially symmetric and horizontally spanning a panel support area, the frame members combining to form a framework for supporting the panels, the access covers and the utility junctions; and
    a plurality of supports for supporting the frame members in one or more generally horizontal planes above a sub-floor;
    wherein at least one frame member attaches to at least three supports not co-linear and provides a central support so that a load can be distributed across the framework.

24. The floor system of claim 23 wherein the frame members have one or more openings in the arms located to removably engage the supports.

25. The floor system of claim 23 wherein the frame members and supports are configured for locking engagement.

26. The floor system of claim 23 further comprising a track having one or more cut-outs for releasably receiving one or more frame members.

27. A floor system comprising:
    a plurality of panels, a pair of adjacent panels having one or more side cut-outs, wherein the side cut-out of adjacent panels defines one or more access apertures;
    a plurality of access covers for covering the access apertures and providing an interface for accessing utilities;
    one or more utility junctions for delivering utilities to the access apertures;
    a plurality of frame members combining to form a framework for supporting the panels, the access covers and the utility junctions; and
    a plurality of supports comprising a height-adjustable stanchion that supports a track having one or more cut-outs for releasably receiving and supporting one or more frame members. in one or more generally horizontal planes above a sub-floor;
    wherein at least one frame member attaches to at least three supports not co-linear and provides a central support so that a load can be distributed across the framework; and
    wherein the track has an interior cavity providing a passageway for routing or distributing utility carriers.

28. The floor system of claim 27 wherein a gap exists along a longitudinal axis of the track between arms of adjacent frame members engaged on opposing sides of the track, whereby utility carriers can be installed through, or within, the gap after the frame members have been installed on the track.

29. The floor system of claim 27 wherein the utilities are one or more of electric power, heating, ventilation or air conditioning, or voice or data communications.

30. A floor system configured for providing a raised floor above a sub-floor in a work environment, comprising:
    a plurality of pedestals;
    a plurality of X-shaped frame members configured to be supported on the pedestals;
    a plurality of panels, a pair of adjacent panels having side cutouts arranged so that the side cutouts are in alignment when the panels are installed on the pedestals to form an access opening from the combination of the side cutouts;
    an access cover configured to fit over the access opening formed from the combination of side cutouts; and
    a track configured to rest upon the pedestals and to provide a passage for a utility carrier.

31. The floor system of claim 30 wherein the track provides a mounting interface for a the frame members.

32. The floor system of claim 30 wherein the utility carrier includes at least one cable providing a connection to at least one of power or voice or data.

33. The floor system of claim 30 wherein the access opening provides a ledge upon which the access cover rests.

34. The floor system of claim 30 wherein the panels form a thick-raised floor.

35. The floor system of claim 30 wherein the access cover is configured to facilitate connectivity to at least one of power or voice or data.

36. The floor system of claim 30 wherein the access cover provides at least one outlet for connectivity to at least one of power or voice or data.

37. The floor system of claim 30 wherein the access cover provides a mechanical interface for at least one article.

38. The floor system of claim 30 wherein the access cover is configured to provide a connection to at least one utility.

39. The floor system of claim 30 wherein the access cover is substantially solid.

40. The floor system of claim 30 wherein the access cover is configured to facilitate the flow of air in connection with an HVAC system.

41. The floor system of claim 30 further comprising an open frame member supported on the pedestals and supporting the panels.

42. The floor system of claim 30 further comprising a utility junction installed directly beneath the access opening.

43. The floor system of claim 30 wherein all of the panels have a side cutout.

44. The floor system of claim 43 wherein the panels have four sides and a side cutout on each of the four sides and wherein the X-shaped frame members are configured to support the panels.

45. A floor system configured for providing a raised floor above a sub-floor to support a load in a work environment, comprising:
   a plurality of pedestals;
   a frame including a combination of frame members to provide a substantially open frame work supported on the pedestals, at least one frame member comprising an X-shaped frame member attaching to at least three pedestals that are not co-linear and providing a central support so that the load is distributed across the frame;
   a plurality of panels configured to be installed on the frame and to be quickly and easily removable.

46. The floor system of claim 45 wherein the frame members comprise a track.

47. The floor system of claim 45 wherein the top of the pedestals is in alignment with the frame members.

48. The floor system of claim 45 wherein the panels form a thick-raised floor.

49. The floor system of claim 45 wherein the panels are thin.

50. The floor system of claim 45 wherein a plurality of panels have side cutouts arranged so that the side cutouts are in alignment when the panels are installed on the pedestals to form an access opening from the combination of the side cutouts.

51. The floor system of claim 45 further comprising an access cover configured to fit over an access opening.

52. The floor system of claim 45 wherein an access opening is configured to provide a passage for a utility carrier.

53. The floor system of claim 52 wherein the utility carrier includes at least one cable providing a connection to at least one of power or voice or data.

54. A floor system comprising:
   a plurality of panels having one or more side cut-outs, wherein the side cut-out of adjacent panels defines one or more access apertures;
   a plurality of access covers for covering the access apertures and providing an interface for accessing utilities;
   one or more utility junctions for delivering utilities to the access apertures;
   a plurality of frame members comprising a plurality of cojoined arms that are cross-shaped and are at least partially symmetric horizontally spanning a panel support area and combining to form a framework for supporting the panels, the access covers and the utility junctions; and
   a plurality of supports for supporting the frame members in one or more generally horizontal planes above a sub-floor.

55. The floor system of claim 54 wherein the frame members have one or more openings in the arms located to removably engage the supports.

56. The floor system of claim 54 wherein the frame members and supports are configured for locking engagement.

* * * * *